Dec. 23, 1958     G. J. WICKE     2,865,178
SHORING APPARATUS
Filed March 19, 1956     2 Sheets-Sheet 1
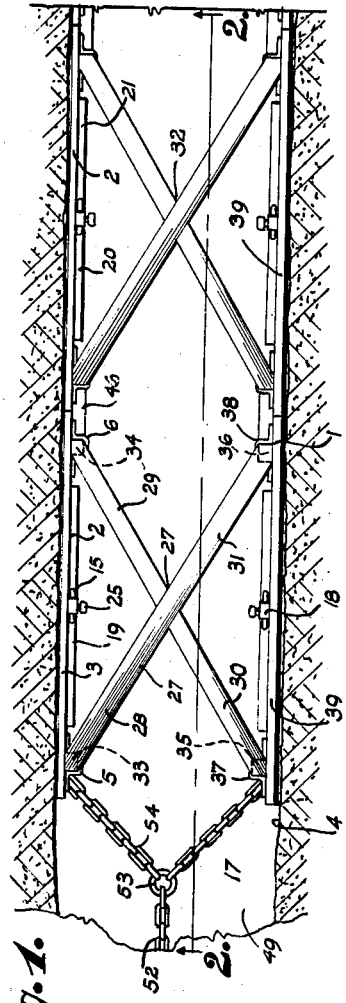
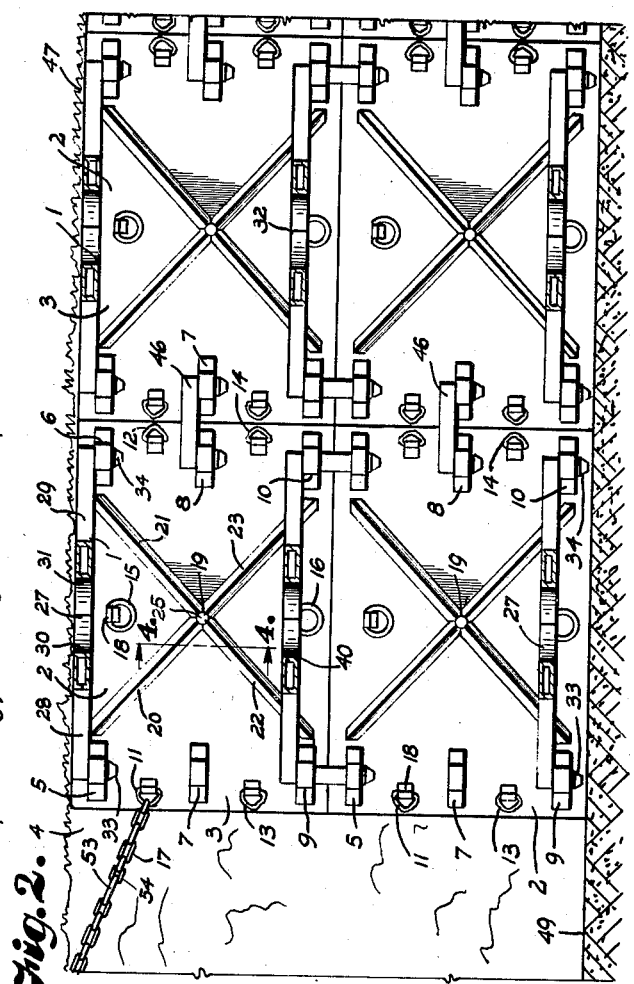
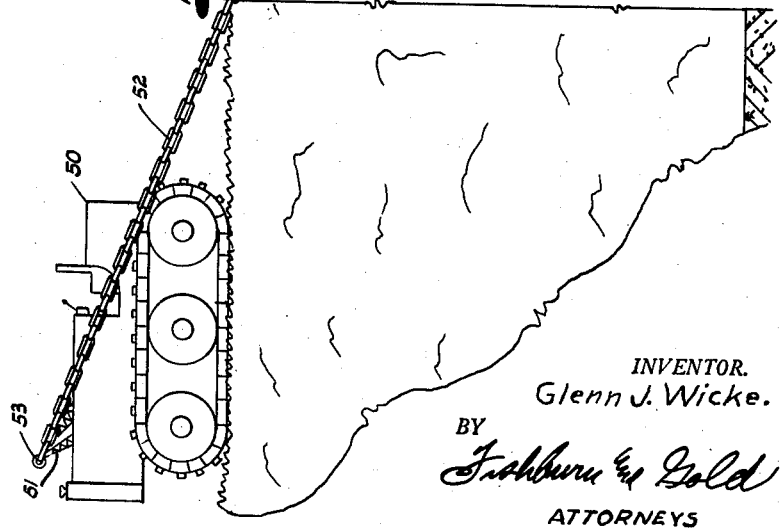
INVENTOR.
Glenn J. Wicke.
BY
ATTORNEYS Dec. 23, 1958

G. J. WICKE 2,865,178

SHORING APPARATUS

Filed March 19, 1956

INVENTOR.
Glenn J. Wicke.
BY
Fishburn & Gold
ATTORNEYS

United States Patent Office 2,865,178
Patented Dec. 23, 1958

2,865,178

SHORING APPARATUS

Glenn J. Wicke, Ottawa, Kans.

Application March 19, 1956, Serial No. 572,384

4 Claims. (Cl. 61—41)

This invention relates to shoring or cribbing to be used to support the side walls of a trench and thereby prevent cave in which can be both dangerous to workmen, and expensive to contractors.

Trench cave in has always been a problem. Therefore it has become standard practice to shore or crib the walls of the trench in order to protect the interests of men engaged in this type work. The form of cribbing most commonly used is planking supported with suitable cross bracing. This has not been very satisfactory. It requires considerable time to install; takes considerable time to remove, and the service life of the materials used is short. It is dangerous. Men must descend to the bottom of the unsupported trench to install the shoring, and uniform safety of construction cannot be obtained.

It is an object of this invention to solve the need for support to trench sidewalls with a cribbing that is both safe and economical.

It is a further object of this invention to supply a cribbing that will give more than adequate support in those trenches which are especially deep, or are excavated in soil which has a wide angle of repose.

Another object of this invention is to supply a modular type construction for ease of installation, and of removal. A construction that can readily be adapted to different depths or lengths of the trench, and can be completely and economically recovered to give a long service life.

Another object of this invention is to furnish a construction that lends itself to being assembled prior to being lowered into the trench, and can be easily removed from the trench.

Another object of the invention is to provide a cribbing structure adapted to be quickly erected and moved along the bottom of the trench to support the side walls thereof in areas where work is progressing; to provide a cribbing structure where a few longitudinal sections with full trench depth can be assembled when it is desirable to have sidewall support only in a short section of the trench and that can be moved along the trench as work progresses, and to provide apparatus of this character where the work in the trench progresses rapidly, and cave in behind the work is not important, and it is only necessary to have wall support to protect men at their work.

It is another object of this invention to provide for moving the cribbing while in the trench, or to provide for easy removal of the cribbing even in those conditions where the earth has caved in against the cribbing.

It is another object of this invention to provide air means to loosen caved in material which rests against the cribbing, said air means thereby assuring easy movement along the trench, and to provide a cribbing structure that is strong, sturdy, easily erected, and efficient in operation to protect workmen and materials from cave ins.

In accomplishing these and other objects of the invention I have provided improved details of structure the preferred form of which is illustrated in the accompanying drawings wherein:

Fig. 1 is a fragmentary plan view which shows the cribbing positioned in the trench.

Fig. 2 is a fragmentary sectional view through the trench and cribbing taken along the line 2—2 of Fig. 1, and showing the cribbing connected to a tractor for movement along the trench.

Figure 3:
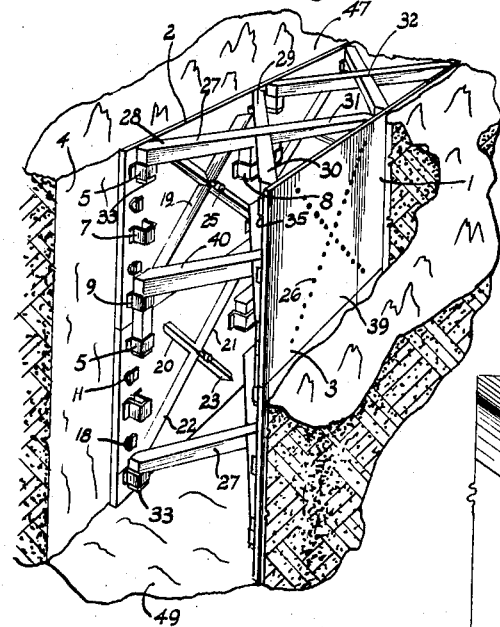
Fig. 3 is a perspective view looking into the trench from above.
Figure 4:
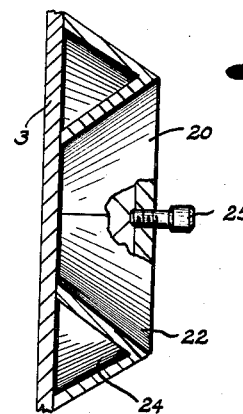
Fig. 4 is an enlarged fragmentary sectional view taken along the line 4—4 of Fig. 2.
Figure 5:
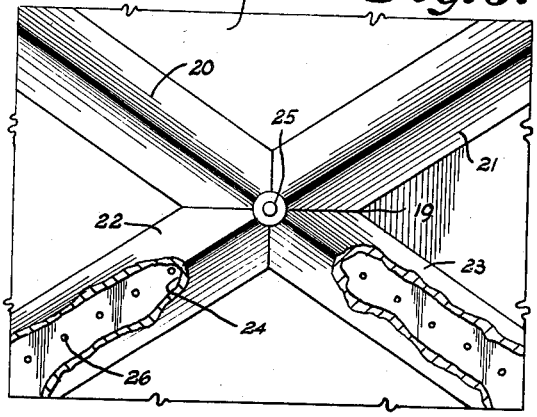
Fig. 5 is a fragmentary elevation of the central portion of a cribbing section.
Figure 6:
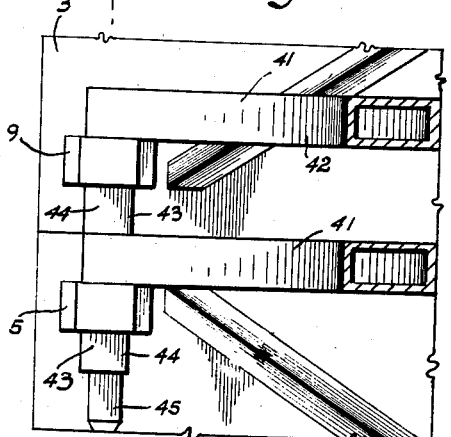
Fig. 6 is an elevation which shows a modification for joining opposite and vertically adjacent panels.
Figure 7:
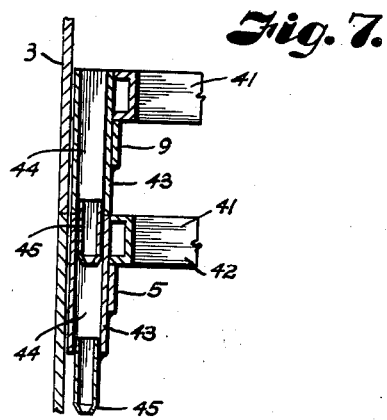
Fig. 7 is a sectional view through adjacent portions of cribbing sections on the line 7—7 of Fig. 6.

Referring more in detail to the drawings:

1 designates cribbing for supporting trench walls, said cribbing being made up of a plurality of panels and interconnecting members. Each panel 2 is preferably approximately four feet high and six feet long. Each panel includes a metal plate 3 which provides the surface of contact with and retains the adjacent side wall of the trench 4. Various members are welded to the plate 3 to form the complete panels 2 and thereby provide the desired interconnecting features.

A plurality of guide brackets 5, 6, 7, 8, 9 and 10 such as metal bars bent into a U-shape with laterally extending ears are suitably secured as by welding to the plate 3. The ears are in the same plane with the inner face of the plate 3, and the opening or socket thus formed by the plate, bar portion and legs of each bracket is parallel with the short side of the panel 2. Brackets 5, 7 and 9 are located near one side of the panel 2, and their openings are vertically aligned. Brackets 6, 8 and 10 are located near the other side of panel 2, and their openings are vertically aligned. Brackets 5 and 6 are positioned near the top of panel 2. Brackets 9 and 10 are positioned near the bottom of panel 2. Brackets 7 and 8 are positioned substantially half way between the top and the bottom of panel 2. A line drawn through 5—6, through 7—8, and through 9—10, would each be parallel to the long side of panel 2. While various arrangements of the brackets may be utilized it is preferable that the brackets be uniformly located whereby the panels are interchangeable and may be inverted and perform the same.

Grab rings 11, 12, 13, 14, 15 and 16 are pivotally mounted on the plate 3 and are to secure a chain 17 to the cribbing and thereby allow power equipment to move the cribbing. Each of the grab rings 11, 12, 13, 14, 15 and 16 is preferably inserted into a hollow cylinder formed on one end of a metal strap 18, and the metal strap 18 is suitably secured as by welding to plate 3. The grab rings are located near the sides of panel 2, with a ring between two brackets, the grab ring 11 being between brackets 5 and 7, grab ring 12 between 6 and 8, grab ring 13 between brackets 7 and 9, grab ring 14 between brackets 8 and 10, grab ring 15 between brackets 5 and 6, and grab ring 16 between brackets 9 and 10. The grab rings are located so as to present a symmetrical design. An air header 19 composed of angle iron members 20, 21, 22 and 23, is mounted on the plate 3. The angle iron members are preferably welded together in an X-shape, and are welded at the edge of their legs to the plate 3 to form an enclosed chamber 24. A quick coupling valve 25 is connected to the header 19 providing communication with the chamber 24, and a plurality of holes 26 are drilled in the plate 3 to give communication from the chamber to the outer side of the cribbing panel. Each panel 2 is fabricated in the same manner so as to give essentially identical symmetrical panels.

Bracing 27 for the cribbing panels is preferably formed of hollow rectangular tubing sections for lightness of weight and with sections 28, 29, 30 and 31 welded into an X-shaped member 32. Legs 33, 34, 35 and 36 are secured as by welding to the X-shaped member 32 at the four extremities thereof and perpendicular to the plane of said member to form legs for insertion into the guide brackets 5, 6, 37 and 38. Guide brackets 37 and 38 being part of panel 39 which is identical with panel 2, and is located at the opposite side of the trench from panel 2.

Bracing 40 is similar to bracing 27, differing only in the fact that the four legs are lengthened to allow them to extend through guide brackets 9 and 10 and on into guide brackets 5 and 6 in the next lower panel.

Bracing 41 is a modified form of X-bracing which permits additional bracing in especially deep trenches, or in trenches where the earth has a wide angle of repose. Bracing 41 is similar to bracing 27 differing only in the structure of the legs. Leg 42 is part of bracing 41 and is made from tubing welded together in an X-shape. Leg 43 is welded perpendicular to the plane of the X-shape at the extremity of leg 42 so as to allow insertion into guide bracket 9 or guide bracket 5. Leg 43 is comprised of rectangular tubing 44 and rectangular tubing 45 is welded to the inside of tubing 44 in a manner which allows bracing 41 to be placed one above the other with the tubing 45 extending into tubing 44 of the bracing below; so that legs 43 will be removably joined.

Bracing 46 is hollow tubing made as in bracing 27, with a single length of tubing with legs welded at the extremities to form a U-shape member for insertion in guide brackets 7 and 8, and thereby join horizontally adjacent panels.

In the preferred modification as shown in Fig. 2 the cribbing may be assembled by placing panels 2 and 39 in vertical position with sides having guide brackets thereon facing one another, and with the long sides horizontal.

The bracing 27 is arranged between opposite panels and legs 33 and 34 inserted into brackets 9 and 10 of panel 2 and the legs 35 and 36 in the corresponding brackets on panel 39. Raise other panels 2 and 39 over the lower assembled respective panels and insert legs of bracing 40 in brackets 9—5 and 10—6, and the corresponding brackets in panel 39. Continue adding pairs of panels 2 and 39 until the desired height is obtained to reach from the bottom to the top of the trench 47. Place bracing 27 in brackets 5, 6, 37 and 38. Connect hoist (not shown) to grab rings 13 and 14 in the lowest panels as assembled and lower into the trench. Additional lengths may be similarly assembled and lowered into the trench. These units can then be joined by inserting legs of bracing 46 into brackets 7 and 8 between each horizontally adjacent panel. This gives a cribbing or shoring that is both safe and economical.

When work is progressing rapidly along the trench, short lengths of this fabricated cribbing can be moved along the bottom 49 of the trench by use of power supplied by tractor 50. A boom 51 extending from the tractor 50 to the side thereof at a point essentially centered on the trench, to which is connected by a chain 52 a chain ring 53 which is connected by chain length 54 to a grab ring 11 and the corresponding ring on panel 39. This allows the cribbing to be moved while in the trench.

Should a cave in make it difficult to move the cribbing forward in the trench or to remove the cribbing from the trench the coupling valve 25 in panel 2 and corresponding valve in panel 39 will be used to connect a compressed air supply (not shown) to the respective air headers 19 whereby air is delivered under pressure to the respective chambers 24 and passes through holes 36 in panel 2 and through corresponding holes in panel 39 in the form of jets for cutting the soil back from the outer surfaces of said plates to free the cribbing for movement along the trench.

This cribbing can be rapidly removed and disassembled by reversing the procedure outlined for assembly to give units which can be reused many times over.

It is understood various modifications nad changes may be made without departing from the spirit of the invention and that the scope thereof is not to be limited by the particular details of the description and drawings except as set forth in the appended claims.

What I claim and desire to secure by Letters Patent is:

1. Cribbing of the character described for excavations such as trenches and the like comprising, a plurality of pairs of oppositely disposed panels for placement against opposite faces of side walls of an excavation and placed in end to end relation, spaced bracket members on the adjacent faces of said opposed panels near the respective end edges, braces between said opposed panels at the upper and lower edges thereof, each of said braces comprising a plurality of arms extending diagonally from one panel to the other and secured together at their centers, means at the extremities of the brace arms and removably engaged with the brackets whereby said braces support the panels against the side walls of the excavation, U-shaped members having legs, one of said legs engaging in a bracket of one panel and the other leg engaging in a bracket of the other panel to hold the panels in end to end relation in said excavation, means on the panels forming elongate chambers, said panels having a plurality of apertures communicating the chambers with the exterior of said panels adjacent the walls of the excavation, means for delivering fluid under pressure to the chambers for discharge in jets through the apertures for cutting the side walls of the excavations and freeing said cribbing from the walls of the excavation, and means for connection with the cribbing for drawing same along said excavation.

2. Cribbing of the character described for excavations such as trenches and the like comprising, pairs of oppositely disposed sectional wall members for placement against opposite faces of side walls of an excavation, said sectional wall members each having a plurality of panels in longitudinal and vertical edge to edge engagement with the next adjacent panel and forming a substantially flat outer face adjacent the side wall of the excavation, said panels each including plate members, spaced bracket members on the adjacent faces of opposed plates near the respective edges thereof and forming aligned sockets, braces between said opposed panels, each of said braces comprising a plurality of arms extending diagonally from one corner of a panel to the other and joined at their centers, legs at the extremities of the brace arms and removably inserted into the bracket sockets whereby said braces support the panels against the side walls of the excavation, the legs on some of the braces being elongated to extend through the sockets of the mating edges adjacent vertical panels, means removably securing the panels in end to end relation, means on the plates forming elongate air chambers, said plates having a plurality of apertures communicating the air chambers with the exterior of said plates adjacent the walls of the excavation, means for delivering air under pressure to the air chambers for discharge in jets through the apertures for cutting the side walls of the excavations and freeing said cribbing from the walls of the excavation, and means for connection with the cribbing for drawing same along said excavation.

3. Cribbing of the character described comprising modular panels and interconnecting bracing, each panel consisting of a plate with U-shaped guide brackets secured to its face and extending laterally from said face, brackets arranged near the vertical sides of the plate with openings parallel to the vertical sides, said panels being contiguous on each side of the trench and the brackets facing in so that opposite panels are aligned and paired, cross shaped bracing essentially horizontal extending between paired panels, said bracing having legs engaging in said guide brackets near each corner of the panels, vertically adjacent panels being joined through brackets with leg extensions from said cross bracing, horizontally adjacent panels joined with U-shape bracing extending into contiguous brackets located centrally in a vertical direction, and means for freeing cribbing from cave in, said means consisting of an X-shaped air chamber mounted on the face of the plate with interconnecting holes to the back of the plate and means for connecting compressed air supply to the chamber.

4. Cribbing of the character described for excavations such as trenches and the like comprising, a series of panels each in edge to edge engagement with the next adjacent panels and forming a coplanar surface for placement against a face of a side wall of an excavation, a second series of panels each in edge to edge engagement with the next adjacent panels for forming a coplanar surface in said second series for placement against the face of the opposite side wall of the excavation in opposed relation to the respective panels of the first named series of panels, a like series of panels on each side of said excavation in edge to edge vertical relation to said first and second series, each of said series of panels each including plate members, spaced bracket members on adjacent faces of the opposed plates and forming sockets, said spaced bracket members being adjacent each of the edges of the respective plates and aligned vertically of each other, rigid braces between opposed panels, each of said braces comprising arms extending diagonally from one panel to the other and rigidly secured to each other at their centers, legs at the extremities of the uppermost and lowermost brace arms and removably inserted into the bracket sockets respectively at the upper and lower edges of the upper and lower plates in a vertical series of plates, like braces between uppermost and lowermost braces and having legs engaging the brackets on the lower edge of the one plate and the brackets on the upper edge of the next lower plate whereby said braces connect the respective series in vertical relation and support the panels against the side walls of the excavation, and rigid arms extending longitudinally of said panels having legs at the extremities thereof and removably inserted in bracket sockets adjacent engaged edges of the respective adjacent panels of a series whereby the arms and legs thereon retain adjacent panels in coplanar relation whereby the panels on each side of the trench may be moved as a unit in parallel relation and not collapse.

References Cited in the file of this patent

UNITED STATES PATENTS

| | | |
|---|---|---|
| 640,377 | Haentges | Jan. 2, 1900 |
| 971,734 | Dravo et al. | Oct. 4, 1910 |
| 1,065,229 | Estes | June 17, 1913 |
| 1,794,704 | Miller | Mar. 3, 1931 |
| 2,656,683 | Riva | Oct. 27, 1953 |

FOREIGN PATENTS

| | | |
|---|---|---|
| 532,849 | Great Britain | Jan. 31, 1941 |